United States Patent
Muromachi et al.

(10) Patent No.: US 7,754,335 B2
(45) Date of Patent: Jul. 13, 2010

(54) VEHICLE WINDOW GLASS AND PROCESS FOR MANUFACTURING THE SAME

(75) Inventors: Takashi Muromachi, Tokyo (JP); Hisashi Ogawa, Tokyo (JP); Mamoru Yoshida, Tokyo (JP); Nobuki Iwai, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 399 days.

(21) Appl. No.: 11/645,922

(22) Filed: Dec. 27, 2006

(65) Prior Publication Data

US 2007/0144656 A1    Jun. 28, 2007

(30) Foreign Application Priority Data

Dec. 28, 2005    (JP)    ............................ 2005-379706

(51) Int. Cl.
*B32B 17/06*    (2006.01)

(52) U.S. Cl. ........................ 428/426; 428/428; 428/432; 428/689; 428/702; 428/213; 428/192

(58) Field of Classification Search ........................ None
See application file for complete search history.

(56) References Cited

U.S. PATENT DOCUMENTS

| | | | |
|---|---|---|---|
| 5,174,066 A | 12/1992 | Dupuy | |
| 6,361,867 B2 * | 3/2002 | Kishida et al. | 428/428 |

FOREIGN PATENT DOCUMENTS

| | | |
|---|---|---|
| EP | 1 541 536 A1 | 6/2005 |
| GB | 1 426 906 A | 3/1976 |
| JP | 06-144874 | 5/1994 |
| JP | 09-235145 | 9/1997 |
| JP | 2002-012024 | 1/2002 |
| WO | WO 04/001338 A1 | 12/2003 |
| WO | WO 2005/095298 A1 | 10/2005 |

OTHER PUBLICATIONS

Translation of WO 2005/095298.*
Translation of JP-2002-012024.*
Translation of JP-09-235145.*

* cited by examiner

*Primary Examiner*—Ling Xu
(74) *Attorney, Agent, or Firm*—Cohen Pontani Lieberman & Pavane LLP

(57) ABSTRACT

A vehicle window glass which is capable of preventing a film formed on a surface of a glass plate from peeling off to thereby improve the appearance quality of an edge portion of the glass plate. The vehicle window glass comprises a polished edge portion of a glass plate and a surface of the glass plate. A film is integrally formed on the surface of the glass plate and on at least one side of the polished edge portion of the glass plate, and a side of the edge portion on which the film is integrally formed is exposed outside when the vehicle window glass is mounted on a vehicle.

17 Claims, 4 Drawing Sheets

VEHICLE WINDOW GLASS AND PROCESS FOR MANUFACTURING THE SAME

BACKGROUND OF THE INVENTION

1. Field of the Invention

The present invention relates to a vehicle window glass and a process for manufacturing the same, more particularly to a vehicle window glass having an infrared cut-off (shielding) function or the like and a process for manufacturing the same.

2. Description of the Related Art

There has been known in recent years imparting an infrared cut-off (shielding) function etc. to a glass by forming a thin film containing an expensive and rare metal, such as indium, on the surface of a glass plate (see International Publications WO2004/01338 and WO2005/095298, for example).

In the infrared shielding glass disclosed in International Publication WO2004/01338, ITO powder with an excellently heat-resistant fluorine component added thereto is used, whereby sol-gel processing is made practicable in the formation of an infrared cut-off film even at temperatures as high as 350° C. or more. The fluorine component contained in the ITO powder is introduced into the infrared cut-off film while thermally protecting the ITO fine particles.

In the infrared cut-off glass disclosed in International Publication WO2005/095298, an infrared cut-off film, made up of an organic-inorganic composite film where organic matter and an inorganic oxide are hybridized and ITO fine particles as an infrared cut-off component added to the composite film, is formed on at least one surface of a glass plate.

A conventional vehicle window glass is manufactured by using a glass plate having been cut to a predetermined shape and chamfering the edge portion of the glass plate. However, there has been known a vehicle window glass with a transparent film layer formed on its edge portion, thereby requiring no chamfering (see Japanese Laid-Open Patent Publication (Kokai) No. 2002-12024, for example).

However, in the infrared shielding glass described in International Publications WO2004/01338 and WO2005/095298, the infrared cut-off film formed on the surface of a glass plate is likely to peel off the glass plate. Particularly when such an infrared shielding glass is used for a vehicle window glass, as shown in FIG. 6, an edge portion 13a of the infrared cut-off film 13 formed on the surface of an infrared shielding glass 11 experiences a force whenever the infrared shielding glass 11 comes in contact with a glass run 12 in a door sash 14 of a vehicle, and besides, the infrared cut-off film 13 is thick. Thus, the infrared cut-off film 13 tends to peel off from its edge portion 13a.

In the vehicle window glass described in Japanese Laid-Open Patent Publication (Kokai) No. 2002-12024, since its edge portion does not undergo chamfering, the edge portion has low strength and its surface is rough and appears poor. Besides, the transparent film layer on the edge portion of the glass plate is not integrally formed with the transparent film layer on the surface of the glass plate, and thus the transparent film layer formed on the surface of the glass plate is likely to peel off the glass plate.

SUMMARY OF THE INVENTION

It is, therefore, an object of the present invention is to provide a vehicle window glass and a process for manufacturing the same, which is capable of preventing a film formed on a surface of a glass plate from peeling off to thereby improve the appearance quality of an edge portion of the glass plate.

To attain the above object, in a first aspect of the present invention, there is provided a vehicle window glass comprising a polished edge portion of a glass plate and a surface of the glass plate, wherein a film is integrally formed on the surface of the glass plate and on at least one side of the polished edge portion of the glass plate, and a side of the edge portion on which the film is integrally formed is exposed outside when the vehicle window glass is mounted on a vehicle.

With the arrangement of the first aspect of the present invention, the film is integrally formed on the surface of the glass plate and the on at least one side of the polished edge portion of the glass plate, and the side of the edge portion on which the film is integrally formed is exposed outside when the vehicle window glass is mounted on the vehicle, whereby the film formed on the surface of the glass plate can be prevented from peeling off and the appearance quality of the edge portion of the glass plate can be improved.

Preferably, the film contains silica and an infrared cut-off component.

With the arrangement of this preferred embodiment, the film has an infrared cut-off (shielding) function.

Preferably, the infrared cut-off component comprises ITO fine particles.

With the arrangement of this preferred embodiment, the vehicle window glass can have an infrared cut-off (shielding) function and appearance quality improved.

Preferably, the film further contains an organic matter.

With the arrangement of this preferred embodiment, cracks can be prevented from occurring by the shrinkage reducing effect of the film when the film is formed.

Preferably, the film has a haze of 7% or less after Taber abrasion resistance test.

With the arrangement of this preferred embodiment, the abrasion resistance of the edge portion of the glass plate can be improved.

Preferably, the vehicle window glass has a thickness of 2.5 to 6.0 mm.

With the arrangement of this preferred embodiment, it is suitably used for vehicle.

Preferably, the film formed on the edge portion of the glass plate has a thickness of 0.1 to 5 μm and the film formed on the surface of the glass plate has a thickness of 0.3 to 3 μm.

With the arrangement of this preferred embodiment, the film can be formed continuously on the edge portion of the glass plate and the surface of the same, and besides, the minute irregularities caused by the polishing of the edge portion of the glass plate can be filled up, and thus the appearance quality of the edge portion of the glass plate can be improved.

To attain the above object, in a second aspect of the present invention, there is provided a process for manufacturing a vehicle window glass, comprising: a polishing step of polishing an edge portion of a glass plate used for the vehicle window glass; a coating step of applying a coating solution to a surface of the glass plate and at least one side of the polished edge portion of the glass plate; and a firing step of firing the coating solution applied to the surface of the glass plate and the at least one side of the polished edge portion of the glass plate, wherein a side of the edge portion on which the film is integrally formed is exposed outside when the vehicle window glass is mounted on a vehicle.

With the arrangement of the second aspect of the present invention, the edge portion of the glass plate used for the vehicle window glass is polished, the surface of the glass plate used for the vehicle window glass and the at least one side of the polished edge portion of the glass plate is coated with a coating solution, and the side of the edge portion on which the film is integrally formed is exposed outside when the glass plate is mounted on a vehicle, whereby the film can be easily and integrally formed on the surface of the glass plate and the edge portion of the glass plate.

Preferably, the coating solution is applied by a flow coating method or a dipping method in the coating step.

With the arrangement of this preferred embodiment, the edge portion of the glass plate and the surface of the same can be continuously coated with the coating solution.

Preferably, the edge portion of the glass plate is polished to a substantially semicircular shape using a diamond grinding wheel in the polishing step.

With the arrangement of this preferred embodiment, the appearance quality and safety of the edge portion of the glass plate can be improved and the film formed on the edge portion of the glass plate is made less likely to peel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

Preferred embodiments of the present invention will be described in detail below with reference to the drawings.

After directing tremendous research effort toward accomplishing the above described object, the present inventors have found that it is capable of preventing the film formed on the surface of the glass plate from peeling off to thereby improve the appearance quality of an edge portion of the glass plate, when, in a vehicle window glass comprising a polished edge portion of a glass plate and a surface of the glass plate, a film is integrally formed on the surface of the glass plate and on at least one side of the polished edge portion of the glass plate, and a side of the edge portion on which the film is integrally formed is exposed outside when the vehicle window glass is mounted on a vehicle.

The present invention has been made based on the above described research results.

Embodiments of the present invention will now be described in detail with reference to the drawings.

Figure 1:
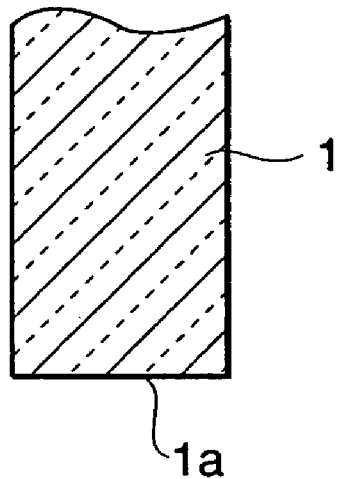
FIG. 1 is a cross sectional view of a vehicle window glass which is useful for explaining a process for manufacturing a vehicle window glass according to an embodiment of the present invention.

FIG. 1 is a view of a vehicle window glass which is useful for explaining a process for manufacturing a vehicle window glass according to an embodiment of the present invention.

In FIG. 1, a glass plate 1 is 2.5 to 6.0 mm thick and preferably 3 to 5 mm thick. An edge portion 1a of the glass plate 1 cut to a predetermined shape is subjected to round surface chamfering (round surface polishing) with a diamond grinding wheel, as shown in FIG. 2.

Figure 2:
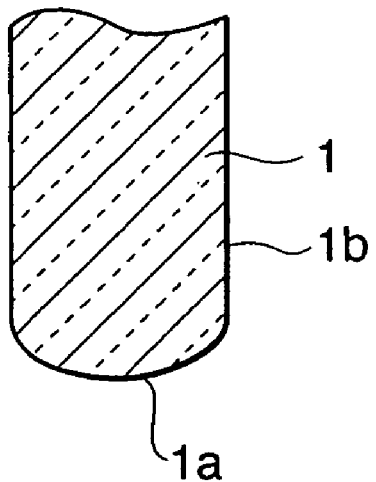
FIG. 2 is a cross sectional view of the glass plate 1 having been subjected to round surface chamfering (round surface polishing)

FIG. 2 is a cross sectional view of the glass plate 1 having been subjected to round surface chamfering (R surface polishing).

In FIG. 2, the edge portion 1a of the glass plate 1 has been polished to a semicylindrical shape (a substantially semicircular cross sectional shape). The glass plate 1 is fixed in such a manner as to allow the surface 1b of the glass plate 1 on which a film is to be formed (the surface of the glass plate) to be at an angle of 0 to 40°, and as shown in FIG. 3, the surface 1b is coated with an infrared cut-off solution 2 by injecting the infrared cut-off solution onto an upper portion of the glass plate 1 and then allowing the solution to flow downward in the vertical direction along the surface (a flow coating method).

Figure 3:
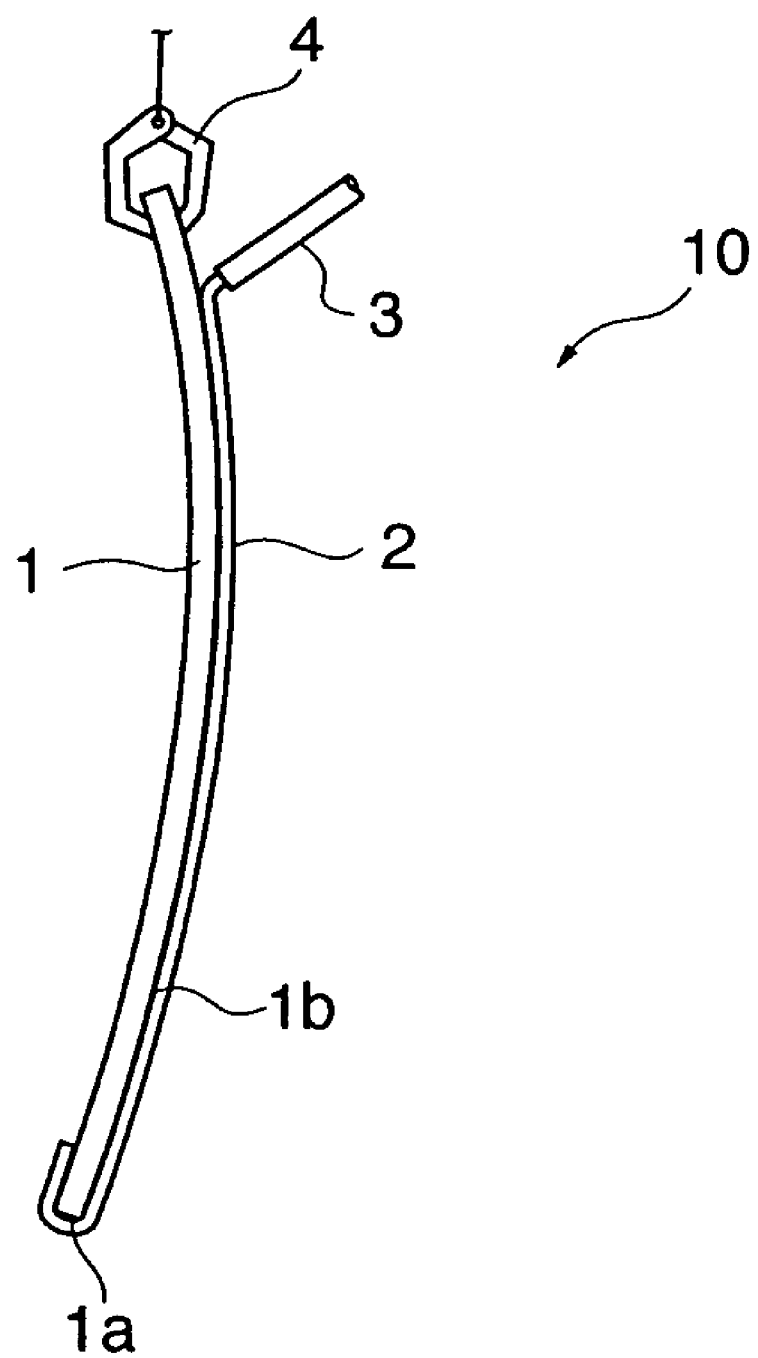
FIG. 3 is a view which is useful for explaining a flow coating method.

FIG. 3 is a view which is useful for explaining a flow coating method.

In FIG. 3, a film forming apparatus 10 includes: a glass plate holding member 4 which holds the glass plate 1; and a nozzle 3 through which the infrared cut-off solution 2 is injected onto the surface 1b of the glass plate 1 on which a film is to be formed. The surface 1b of the glass plate 1 is coated with the infrared cut-off solution 2 by injecting the infrared cut-off solution 2 onto the upper portion of the glass plate 1 through the nozzle 3 while holding the glass plate 1 vertical with the glass plate holding member 4 and allowing the infrared cut-off solution 2 to flow downward in the vertical direction on the glass plate 1.

In this operation, if the infrared cut-off solution 2 is allowed to go around the edge portion 1a at the bottom of the glass plate 1, the edge portion 1a is coated with the infrared cut-off solution 2 at the same time.

Figure 4:
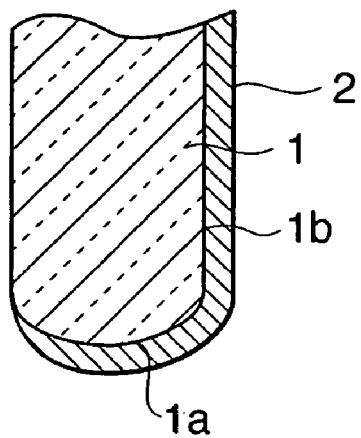
FIG. 4 is a cross sectional view of the glass plate 1 coated with an infrared cut-off solution 2.

FIG. 4 is a cross sectional view of the glass plate 1 coated with the infrared cut-off solution 2.

In FIG. 4, the surface 1b of the glass plate 1 on which a film is to be formed and the edge portion 1a of the same are coated with the infrared cut-off solution 2. The glass plate 1 with its surface 1b and edge portion 1a having been coated with the infrared cut-off solution 2 is dried at a room temperature for about 5 minutes, introduced into an oven previously heated to 200° C. and heated for 10 minutes, and cooled, whereby the glass plate 1 with an infrared cut-off film is obtained.

The infrared cut-off solution 2 includes: a chief ingredient including a silica component that contains silica ($SiO_2$) as a constitutional unit; organic matter; ITO fine particles (Indium (In)-Tin (Sn) oxide); inorganic matter; and an alcohol such as ethanol as a solvent.

The organic matter in the infrared cut-off solution 2 is originated from Solsperse (dispersant) and polyethylene glycol 200.

The inorganic matter in the infrared cut-off solution 2 is tetraethoxysilane (TEOS) or the like originated from ethyl silicate 40 or the like.

The silica component and the organic matter form the matrix in the infrared cut-off film formed on the surface 1b of the glass plate 1.

To form a film of the infrared cut-off solution while allowing the ITO fine particles to be dispersed in the matrix that contains a silica component and organic matter, the sol-gel processing is used. The ITO fine particles are fixed in the matrix, while kept dispersed in the same, by solidifying the matrix in the sol state by the sol-gel processing. The content of the ITO fine particles, in a state where they are fixed in the matrix, in the entire mass of the infrared cut-off film is 20 to 45 mass %. If the content is less than 20 mass %, the infrared cut-off function is decreased, while the amount is more than 45 mass %, the hardness of the matrix is decreased.

The particle size of the ITO fine particles is 100 nm or less, preferably 40 nm or less and more preferably between 1 and 40 nm. The particle size in such a range makes the infrared cut-off more efficient and makes possible the inhibition of haze caused by the large particle size of fine particles.

As the organic matter in the infrared cut-off film, either a hydrophilic organic polymer, such as a polyalkylene oxide, or a pyrolytic product of polyalkylene oxide is used. Any of these types of organic matter is hybridized with an inorganic oxide containing a silica component, such as silicon alkoxide, to form a matrix. In other words, the matrix is an organic-inorganic composite film composed of an organic-inorganic composite compound produced by binding or combining of organic matter with an inorganic oxide at the molecular level.

A hard film with a haze of 7% or less after the abrasion resistance test in accordance with JIS R3212 can be obtained by allowing the matrix to be an organic-inorganic composite film composed of an organic-inorganic composite compound produced by binding or combining of organic matter with an inorganic oxide at the molecular level.

The content of the above described organic matter in the entire mass of the infrared cut-off film is 2 to 60%. If the content is less than 2 mass %, a sufficient shrinkage reducing effect cannot be produced, whereby cracks are more likely to occur when forming a thick film. In contrast, if the content is more than 60 mass %, the content of the organic matter in the infrared cut-off film is so large that sufficient hardness cannot be produced.

The content of the silica component in the entire mass of the infrared cut-off film is 20 to 78% and preferably 40 to 78%. If the content is less than 20 mass %, the haze of the infrared cut-off glass measured after conducting the abrasion resistance test (Taber abrasion resistance test) for the surface of the glass plate on which the infrared cut-off film has been formed cannot be lowered. The concentration of the silica component in the starting material for the matrix which is added to the solution used in the sol-gel process is 20 to 40 mass %.

The above described concentration of the silica component (mass %) is calculated on the basis of the content of silica as a constitutional unit of the silica component. For example, even when the above described organic matter and silica (silicon oxide) constitute an amorphous as a composite compound, the percentage by mass of the silica component is calculated on the basis of the silica content.

By the above described production technique, desired characteristics of infrared cut-off glass can be obtained by firing the coating solution at temperatures that allow the heat shielding function or infrared cut-off function of ITO fine particles to be maintained and are lower than the decomposition temperatures of the above described functional materials, for example, at 200° C. This makes it possible to provide an infrared cut-off glass in which ITO fine particles, which are thermally unstable, and other functional materials are introduced into its infrared cut-off film while keeping their functions.

In the infrared cut-off glass, light transmittance is 30% or less in the wavelength range of 1000 to 1600 nm and 20% or less in the wavelength range of 1600 to 2500 nm.

In the glass plate 1 of FIG. 4, an infrared cut-off film is integrally formed on the surface 1b of the glass plate 1 on which the film is to be formed and the polished edge portion 1a, whereby the infrared cut-off film formed on the surface 1b can be prevented from peeling off the glass plate 1.

The edge portion 1a of the glass plate 1 having been subjected to round surface chamfering (round surface polishing) has minute irregularities. With the increase in area where the glass plate 1 and the infrared cut-off film are contact with each other, the infrared cut-off film fills up the irregularities, whereby the infrared cut-off film formed on the edge portion 1a is less likely to peel off the glass plate 1.

The infrared cut-off film formed on the edge portion 1a of the glass plate 1 is 0.1 to 5 μm thick and the infrared cut-off film formed on the surface 1b of the glass plate 1 on which a film is to be formed is 0.3 to 3 μm thick.

After the surface 1b of the glass plate 1 on which a film is to be formed and the edge portion 1a are coated with the infrared cut-off solution 2 by a flow coating method, the infrared cut-off solution 2 having flowed under the edge portion 1a in such a manner that it covers the portion may be wiped up using a wiping cloth etc. impregnated with the infrared cut-off solution 2. This makes it possible to coat the edge portion 1a with the infrared cut-off solution 2 more uniformly. The infrared cut-off solution 2 to be impregnated into a wiping cloth need not always contain ITO fine particles and organic matter.

EXAMPLES

An example of the present invention will now be described.

A solution prepared by adding polyethylene glycol (PEG 400: KANTO CHEMICAL CO., INC.), pure water, polyether phosphate ester surfactant (SOLSPERSE 41000: LUBRIZOL JAPAN LIMITED) as a polymer dispersant and denatured alcohol (SOLMIX (Trade Mark) AP-7: NIPPON ALCOHOL HANBAI Company (hereinafter referred to as "AP-7")) in this order was stirred for 1 minute, and AP-7 to which 1 mass % of concentrated hydrochloric acid (KANTO CHEMICAL CO., INC.) (hereinafter referred to as "1 mass % AP-7") was added to the above solution and stirred for 1 minute.

Then, tetraethoxysilane (KBE-04: Shin-Etsu Chemical Co., Ltd. The content of silica component=28.8 mass %) was added to the above described solution and stirred for 4 hours. Then an ITO dispersion obtained by mixing ITO fine particles and ethanol at a mass ratio of 2:3 and stirring for 4 hours was added to the solution and stirred for 30 minutes to obtain an infrared cut-off solution 2. The amount of each solution was as described in Table 1. The ITO fine particles used in the ITO dispersion were about 10 to 20 nm in diameter.

TABLE 1

| | | | | | | (unit: g) |
|---|---|---|---|---|---|---|
| Water | Denatured alcohol | 1 mass % AP-7 | Tetraethoxysilane | Polymer dispersant | Polyethylene glycol | ITO dispersion |
| 5.86 | 12.44 | 3 | 6.25 | 0.162 | 0.036 | 2.25 |

Figure 5:
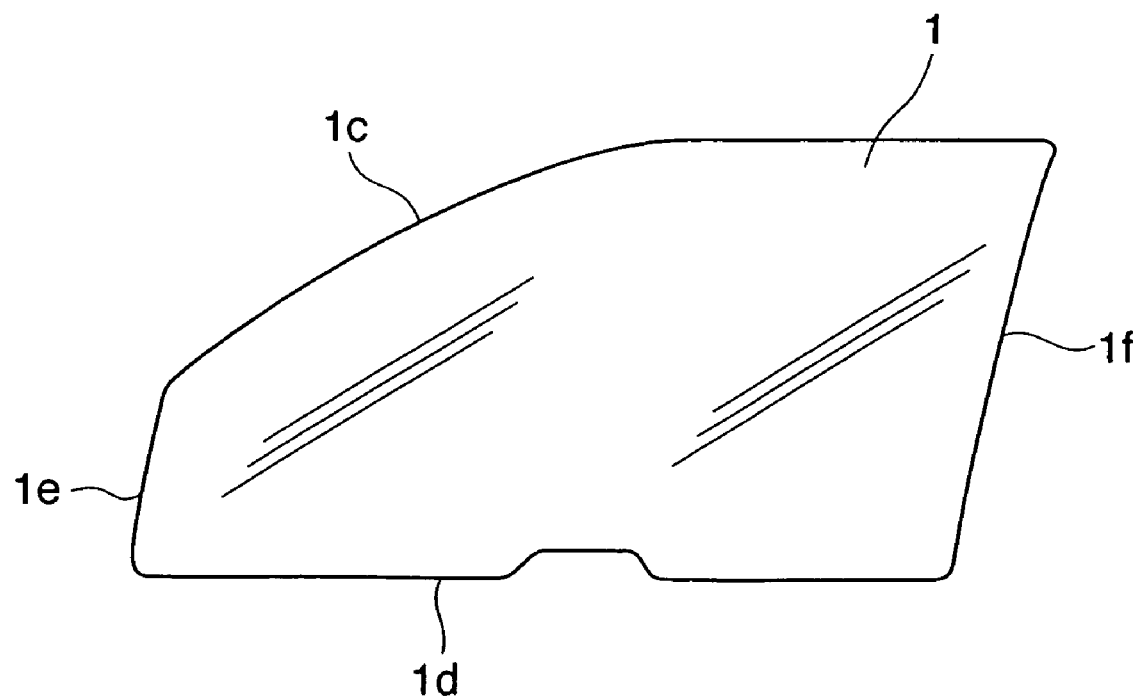
FIG. 5 is a view showing an automotive door glass.
Figure 6:
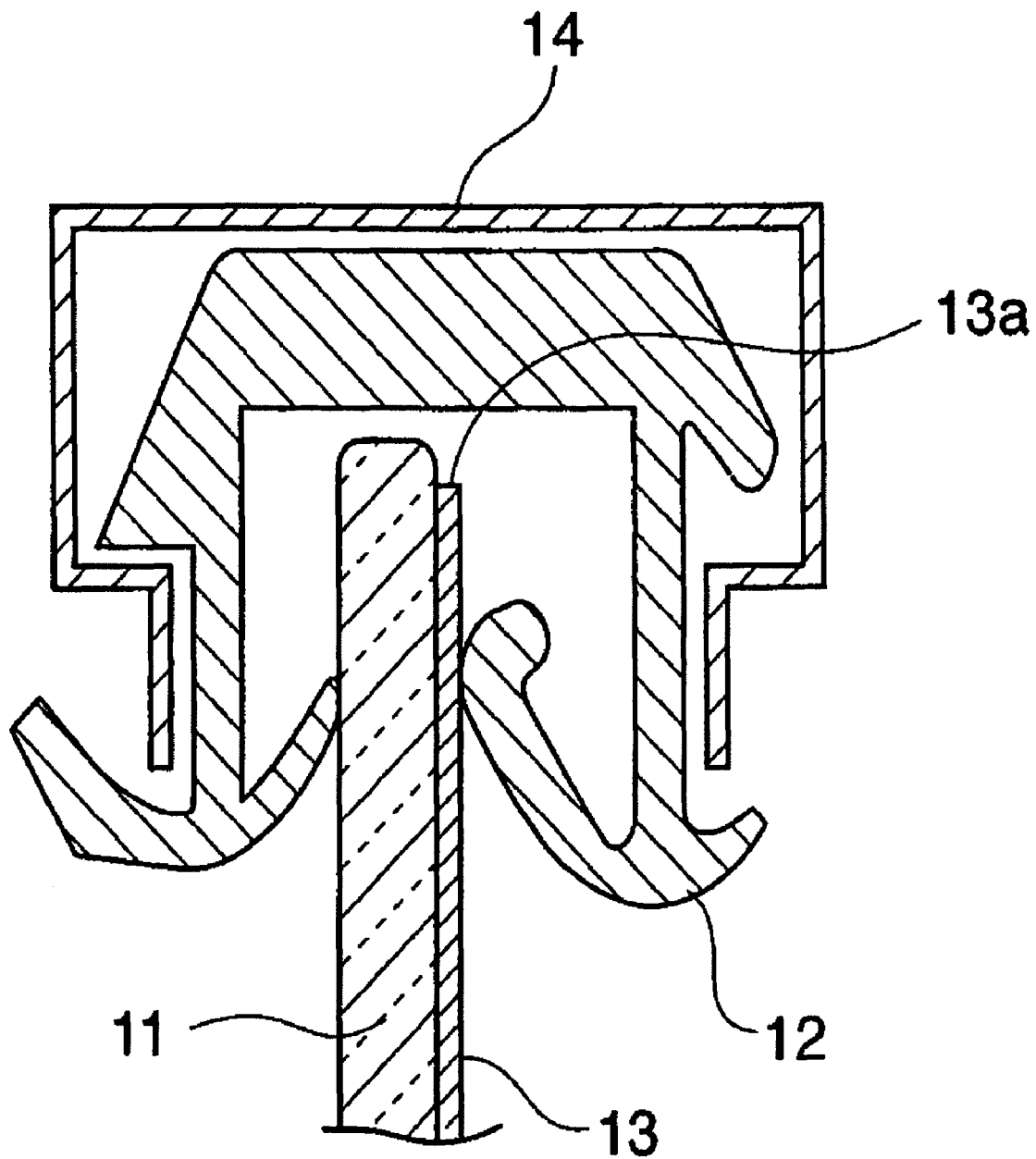
FIG. 6 is a view which is useful for explaining a conventional infrared shielding glass for use in a vehicle window glass.

Then, as a glass plate 1, was prepared an automotive door glass (green glass having a UV absorbing function) 4 mm thick obtained by subjecting the edge portion 1a of a glass plate to round surface chamfering (round surface polishing) using a diamond grind wheel, bending tempering to a predetermined shape, and washing the surface on which a film was formed (FIG. 5).

The glass plate 1 of FIG. 5 includes 4 sides: a top side 1c, a bottom side 1d, right-and left-hand sides 1e, 1f, on the basis of the direction in which it is fitted into a door, and an edge portion 1a. Of these 4 sides, a side of the glass plate 1 which is exposed outside when the glass plate is fitted into a door is the top side 1c alone, or the top side 1c and the right-and left-hand sides 1e, 1f.

For Example 1, the glass plate 1 was fixed with the top side 1c, on the basis of the direction in which the glass plate is fitted into a door, down and the surface 1b on which a film was to be formed at an angle of about 10°, and the surface of the glass plate 1 was coated with an infrared cut-off solution 2 under conditions: relative humidity of 30% and temperature of 20° C. by a method of allowing the infrared cut-off solution 2 having been injected onto the upper portion of the glass plate 1 to flow downward in the vertical direction (a flow coating method). In this operation, the edge portion 1a of the glass plate 1 on the top side 1c, on the basis of the direction in which the glass plate was fitted into a door, was coated with the infrared cut-off solution 2 at the same time by allowing the solution 2 to go around the edge portion 1a.

The glass plate 1 with the infrared cut-off solution 2 applied to its surface was dried at a room temperature for about 5 minutes, introduced into an oven having been heated to 200° C. in advance and heated for 10 minutes, and cooled to obtain infrared cut-off glass.

For Comparative Example 1, the glass plate 1 was fixed with the top side 1c, on the basis of the direction in which the glass plate was fitted into a door, up and coated with the infrared cut-off solution 2 by flow coating. Since the glass plate 1 was fixed with the top side 1c, on the basis of the direction in which the glass plate was fitted into a door, up, the edge portion 1a of the glass plate 1 on the top side 1c could not be coated with the infrared cut-off solution 2.

The glass plates 1 of Example 1 and Comparative Example 1 were fitted into the respective automotive doors and moved up and down 5000 times. After that, whether the infrared cut-off film peeled off or not was checked for each glass plate 1. And the edge portion 1a of each glass plate 1 was evaluated for its appearance quality and abrasion resistance. The results are shown in Table 2.

TABLE 2

|  | Edge portion | Peeling off of IR cut-off film | Appearance quality | Abrasion resistance of edge portion |
| --- | --- | --- | --- | --- |
| Example 1 | Coated | Unlikely to peel | Good | Good |
| Comparative Example 1 | Not coated | Likely to peel | No good | No good |

For Comparative Example 1, the peeling off of the infrared cut-off film was observed after 5000-time up-and-down movement of the glass plate 1. For Example 1, the peeling off of the infrared cut-off film was not observed after 5000-time up-and-down movement of the glass plate 1. For example 1, the surface 1b on which a film was formed and the polished edge portion 1a were coated with the infrared cut-off solution 2 and an infrared cut-off film was integrally formed on them, thus, the infrared cut-off film was not likely to peel off, compared with that of Comparative Example 1.

Further, white turbidity due to light scattering associated with the irregularities was not observed on the polished edge portion 1a of the glass plate 1, and the edge portion 1a obtained gave forth a black luster and was of high appearance quality.

On the edge portion 1a of the glass plate 1, like the surface 1b on which a film was formed, a hard infrared cut-off film having a haze of 7% or less after abrasion resistance test in accordance with Japanese Industrial Standards JIS R3212 was formed, and thus, the edge portion 1a had high abrasion resistance and supported its appearance quality.

According to the embodiment of the present invention, an infrared cut-off film is integrally formed on the surface 1b of the glass plate 1 on which a film is to be formed and the polished edge portion 1a, whereby the infrared cut-off film formed on the surface 1b can be prevented from peeling off the glass plate 1 and the appearance quality of the edge portion 1a can be improved.

According to the embodiment of the present invention, the infrared cut-off solution 2 is allowed to go around the edge portion 1a at the bottom of the glass plate 1 so that the edge portion 1a can be coated with the infrared cut-off solution 2 at the same time, whereby an infrared cut-off film can be easily and integrally formed on the surface 1b on which a film is to be formed and on the edge portion 1a.

In the embodiment of the present invention, after the edge portion 1a of the glass plate 1 was coated with the infrared cut-off solution 2, the coating was dried at a room temperature for about 5 minutes, and then the glass plate 1 with the infrared cut-off solution 2 applied to its surface 1b and edge portion 1a was introduced into an oven previously heated to 200° C. where the coating was heated for 10 minutes and fired. However, when a film is formed which requires firing at temperatures as relatively high as about 600° C., the glass plate 1 can be subjected to bending after the edge portion 1a of the glass plate 1 is coated with the infrared cut-off solution 2 so that the step of heating at the time of bending serves as the step of firing. This eliminates one step from the film forming process and reduces the cost.

While the present invention has been described in terms of an embodiment where the glass plate 1 is coated with the infrared cut-off solution 2, the present invention is not limited thereto, and other coating solutions can also be applied to the glass plate 1.

While the invention has been described in terms of an embodiment where the glass plate 1 is coated with the infrared cut-off solution 2 by a flow coating method, the present invention is not limited thereto, and a method of dipping the glass plate 1 in the infrared cut-off solution 2 (dipping) can also be employed.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A vehicle window glass comprising a polished edge portion of a glass plate and a surface of the glass plate,
    wherein a film is integrally formed on the surface of the glass plate and on at least one side of the polished edge portion of the glass plate, wherein the at least one side of the polished edge portion on which the film is integrally formed is exposed outside when the vehicle window glass is mounted on a vehicle, and wherein the film covers not less than 50% of an area of the surface of the glass plate.

2. The vehicle window glass according to claim 1, wherein the film contains silica and an infrared cut-off component.

3. The vehicle window glass according to claim 2, wherein the infrared cut-off component comprises ITO fine particles.

4. The vehicle window glass according to claim 1, wherein the film further contains an organic matter.

5. The vehicle window glass according to claim 1, wherein the film has a haze of 7% or less after Taber abrasion resistance test.

6. The vehicle window glass according to claim 1, wherein the vehicle window glass has a thickness of 2.5 to 6.0 mm.

7. The vehicle window glass according to claim 1, wherein the film formed on the polished edge portion of the glass plate has a thickness of 0.1 to 5 μm and the film formed on the surface of the glass plate has a thickness of 0.3 to 3 μm.

8. The vehicle window glass according to claim 1, wherein the film covers not less than 85% of the area of the surface of the glass plate.

9. A vehicle window glass comprising:

a glass plate having a major surface and a polished edge portion, a film integrally formed on the major surface of the glass plate and on at least one side of the polished edge portion of the glass plate, wherein the at least one side of the polished edge portion on which the film is integrally formed is exposed outside when the vehicle window glass is mounted on a vehicle, wherein the film covers a central portion of the major surface of the glass plate.

10. The vehicle window glass according to claim 9, wherein the film contains silica and an infrared cut-off component.

11. The vehicle window glass according to claim 10, wherein the infrared cut-off component comprises ITO fine particles.

12. The vehicle window glass according to claim 9, wherein the film further contains an organic matter.

13. The vehicle window glass according to claim 9, wherein the film has a haze of 7% or less after Taber abrasion resistance test.

14. The vehicle window glass according to claim 9, wherein the vehicle window glass has a thickness of 2.5 to 6.0 mm.

15. The vehicle window glass according to claim 9, wherein the film formed on the polished edge portion of the glass plate has a thickness of 0.1 to 5 μm and the film formed on the major surface of the glass plate has a thickness of 0.3 to 3 μm.

16. The vehicle window glass according to claim 9, wherein the film covers not less than 50% of an area of the major surface of the glass plate.

17. The vehicle window glass according to claim 9, wherein the film covers not less than 85% of an area of the major surface of the glass plate.

* * * * *